US007440973B2

(12) United States Patent
Tsukerman et al.

(10) Patent No.: US 7,440,973 B2
(45) Date of Patent: Oct. 21, 2008

(54) SYSTEMS, METHODS AND SOFTWARE FOR AUTOMATING DATABASE TASKS

(75) Inventors: Alex Tsukerman, Foster City, CA (US); Jane Xin Chen, Belmont, CA (US); Jacco Draaller, Belmont, CA (US); Eric P. Voss, Redwood Shores, CA (US); Mineharu Takahara, Redwood City, CA (US); Mark Ramacher, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 390 days.

(21) Appl. No.: 10/903,594

(22) Filed: Jul. 29, 2004

(65) Prior Publication Data

US 2006/0026212 A1      Feb. 2, 2006

(51) Int. Cl.
*G06F 7/00* (2006.01)
(52) U.S. Cl. .................................... 707/104.1; 707/200
(58) Field of Classification Search ................. 707/200; 700/98; 702/62; 718/101
See application file for complete search history.

(56) References Cited

U.S. PATENT DOCUMENTS 6,088,659 A * 7/2000 Kelley et al. ................. 702/62
6,715,145 B1 * 3/2004 Bowman-Amuah ......... 718/101
6,738,748 B2 * 5/2004 Wetzer ........................... 705/9
7,023,979 B1 * 4/2006 Wu et al. ................ 379/265.11
7,103,434 B2 * 9/2006 Chernyak et al. ............. 700/98
2002/0091708 A1    7/2002 Vos et al.

OTHER PUBLICATIONS

The Open Group, *Technical Standard, Distributed Transaction Processing: The XA Specification*, X/Open CAE Specification, X/Open Company Limited. (Dec. 1991), pp. 3-74.

* cited by examiner

*Primary Examiner*—Sathyanarayan Pannala
(74) *Attorney, Agent, or Firm*—Townsend and Townsend and Crew LLP

(57) ABSTRACT

Various embodiments of the invention provide solutions to facilitate the management and/or automation of various database tasks, in particular system tasks. Merely by way of example, some embodiments provide methods systems and/or software products that can facilitate automation of such tasks. In accordance with certain embodiments, a maintenance window may be defined. The maintenance window can provide an opportunity for system tasks (and/or other tasks, especially those that consume significant database resources) to execute without significantly impacting the usability of the database. In particular embodiments, a maintenance window may be defined to coincide with a period of relatively low user activity. In some cases, a maintenance window may be implemented in conjunction with a job scheduler and/or a resource manager. Merely by way of example, a resource manager might allocate relatively more system and/or database resources to system tasks during the maintenance window, and/or a job scheduler may schedule system tasks to execute during the maintenance window.

33 Claims, 6 Drawing Sheets

SYSTEMS, METHODS AND SOFTWARE FOR AUTOMATING DATABASE TASKS

BACKGROUND

The present invention relates to generally computer systems, and particularly to computer database management systems.

For years, databases have provided an efficient way to store and/or organize massive amounts of information, allowing searching, processing, etc. of that information in a relatively expeditious manner. In order to perform optimally, however, databases generally need to be maintained at regular intervals. Merely by way of example, those skilled in the art will appreciate that a database may need to be "purged" at regular intervals in order to excise old and/or unused information from the database, lest the database become unnecessarily unwieldy from the inclusion of such information.

In addition, as databases and/or database management systems (sometimes referred to as "relational database management systems" or by the abbreviation "RDBMS") have grown more sophisticated in recent years. Merely by way of example, modern database systems, such as the Oracle 10g™ RDBMS available from Oracle Corp., provide tools that allow an administrator to analyze the database, components thereof and/or data contained within the database, e.g., to allow the database to be tuned for better performance under certain circumstances. Moreover, due to the mission-critical nature of many database systems, best practices often mandate the periodic backup of the database (and/or its data), the replication of multiple instances of databases, etc.

In the past, most (if not all) of these maintenance, tuning and analysis tasks have been manually by an administrator, or at best, on a semi-automated basis (for instance, by an administrator scheduling a maintenance job, etc.). In order to compete in the marketplace, however, database vendors are under increasing pressure to automate as many such tasks as possible, creating a need for solutions to facilitate such automation.

SUMMARY

Various embodiments of the invention provide solutions to facilitate the automation and/or management of various database tasks, in particular system tasks. Merely by way of example, some embodiments provide methods systems and/or software products that can facilitate automation of such tasks. In accordance with certain embodiments, a maintenance window may be defined. The maintenance window can provide an opportunity for system tasks (and/or other tasks, especially those that consume significant database resources) to execute without significantly impacting the usability of the database. In particular embodiments, a maintenance window may be defined to coincide with a period of relatively low user activity. In some cases, a maintenance window may be implemented in conjunction with a job scheduler and/or a resource manager. Merely by way of example, a resource manager might allocate relatively more system and/or database resources to system tasks during the maintenance window, and/or a job scheduler may schedule system tasks to execute during the maintenance window.

One set of embodiments provides methods of managing system tasks and/or resources. Merely by way of example, a method in accordance with some embodiments may comprise defining a maintenance window during which system tasks may be executed without significantly impacting user tasks and/or scheduling at least one system task to execute during the maintenance window. Such system tasks may comprise, merely by way of example, a purge operation, a statistic gathering operation, a database analysis operation, a feature usage analysis operation, a backup operation and/or a database replication operation. In some cases, the execution of the at least one system task may imposes a relatively minimal impact on at least one user task. Optionally, the method may include allocating relatively greater system resources to the at least one system task during the defined maintenance window and/or inhibiting the at least one system task from executing except during the defined maintenance window.

In accordance with particular embodiments, the method may include estimating whether the a duration of the defined maintenance window will be sufficient to allow complete execution of the at least one system task and/or issuing a warning if it is estimated that the duration of the defined maintenance window will not be sufficient will not be sufficient to allow complete execution of the at least one system task. Alternatively, if it is estimated that the duration of the defined maintenance window will not be sufficient will not be sufficient to allow complete execution of the at least one system task and/or the defined maintenance window, the system task may be disabled, the defined maintenance window may be extended, and/or the like.

In some embodiments, the method may include evaluating the at least one system task to determine whether the at least one system task likely will consume sufficient resources to impact user tasks and/or determining (perhaps based on an evaluation of the at least one system task) that the system task should be inhibited from executing except during the defined maintenance window. In other embodiments, the method might include inhibiting the execution of the at least one user task during the defined maintenance window. In some cases, a user may be allowed to schedule a user task to run as a system task during the defined maintenance window.

In further embodiments, a resource plan may be established; the resource plan may define how system resources should be allocated among a plurality of competing tasks, the plurality of competing tasks comprising the at least one user task and the at least one system task. The resource plan may be modified to allocate relatively more system resources to the at least one system task during the defined maintenance window and/or a second resource plan may be established. The second resource plan might define how system resources should be allocated among the plurality of competing tasks during the defined maintenance window; in some cases, the second resource plan may allocate relatively more system resources to the at least one system task during the defined maintenance window than the first resource plan.

The maintenance window might be defined automatically, manually (e.g., by a user) and/or interactively. In some cases, defining a maintenance window comprises analyzing a historical pattern of user activity for the database (the historical pattern of user activity might comprise at least one periodic segment of relatively high user activity and at least one periodic segment of relatively low user activity) and/or defining a maintenance window that coincides with the at least one periodic segment of relatively low user activity. In other cases, defining a maintenance window can comprise allowing a user to define a maintenance window. In particular cases, one or more maintenance windows may be defined to recur periodically.

In still other cases, defining a maintenance window can comprise defining a plurality of maintenance windows. The plurality might include a first maintenance window and a second maintenance window, and the method might further comprise defining a maintenance window group, which might comprise the first maintenance window and the second maintenance window. Further, scheduling at least one system task to execute during the maintenance window may comprise scheduling a first system task to execute during the first maintenance window and/or scheduling a second system task to execute during the second maintenance window. In some embodiments, the first maintenance window is defined to recur periodically over a first interval, such that the first system task executes periodically over the first interval and/or the second maintenance window is defined to recur periodically over a second interval, such that the second system task executes periodically over the second interval. The first interval might not be the same as the second interval.

In accordance with certain embodiments, the method may include procedures to address a situation in which a system task has not finished executing before the maintenance window has expired. Merely by way of example, the system task may be allowed to finish executing outside the maintenance window. Alternatively, the system task may be sopped at the expiration of the maintenance window, and/or the method can include rolling back a result of the at least one system task to a state that existed before the execution of the at least one system task. In some cases, a state of the system task may be saved and/or the system task may be resumed during a subsequent maintenance window (perhaps based on the saved state of the system task). In other cases, an administrator may be notified that the system task failed to fully execute and/or an administrator may be allowed to increase the duration of a subsequent maintenance window (e.g., to allow the at least one system task to fully execute during the subsequent maintenance window). Alternatively, the duration of a subsequent maintenance window may be automatically increased.

Another set of embodiments provides software frameworks, some of which can be used to manage system tasks/resources and/or to perform methods of the invention. Merely by way of example, one embodiment of a software framework may comprise a maintenance window during which system tasks may be executed without significantly impacting user tasks and/or a resource manager, which may be configured to establish at least one resource plan. The resource plan may define how system resources should be allocated among a plurality of competing tasks, which might comprise at least one user task and at least one system task. The framework may further comprise a job scheduler, which might be configured to govern the execution of the at least one system task.

In accordance with some embodiments, the resource manager is configured to allocate relatively more system resources for the at least one system task during the system defined maintenance window. In other embodiments, the job scheduler is configured to inhibit the at least one system task from executing automatically except during the system-defined maintenance window.

A further set of embodiments provides systems, including computer systems, which may be used to implement methods and/or software frameworks of the invention. Merely by way of example, a system in accordance with some embodiments of the invention may comprise a database, a processor in communication with the database and/or a computer readable medium in communication with the processor. The computer readable medium may comprise instructions executable by a processor. e.g., to perform methods of the invention, implement software frameworks of the invention, etc.

In certain embodiments, for example, the instructions can be executable to define a maintenance window for the database during which system tasks may be executed without significantly impacting user tasks and/or to schedule at least one system task to execute during the maintenance window. The execution of the at least one system task therefore may impose a relatively insignificant impact on at least one user task. In some embodiments, the instructions might be further executable to allocate relatively greater system resources to the at least one system task during the defined maintenance window and/or to inhibit the at least one system task from executing except during the defined maintenance window.

Yet a further set of embodiments provides computer software, including computer programs, which may be stored on computer readable media, and which may be used to perform the methods of the invention. Merely by way of example, a computer program in accordance with some embodiments may include instructions executable by a computer to define a maintenance window for the database during which system tasks may be executed without significantly impacting user tasks and/or to schedule at least one system task to execute during the maintenance window, such that the execution of the at least one system task imposes a relatively insignificant impact on at least one user task. In some cases, the program might include further instructions executable to allocate relatively greater system resources to the at least one system task during the defined maintenance window and/or to inhibit the at least one system task from executing except during the defined maintenance window.

The invention has been briefly summarized above. A further understanding of specific details and features of the invention may be realized by reference to the remaining portions of the specification and the drawings.

BRIEF DESCRIPTION OF THE DRAWINGS

Illustrative embodiments in accordance with the invention are illustrated in the drawings in which.

DETAILED DESCRIPTION

1. General Overview

Various embodiments of the invention provide solutions to facilitate the automation and/or management of various database tasks, in particular system tasks. Merely by way of example, some embodiments provide methods systems and/or software products that can facilitate automation of such tasks. In accordance with certain embodiments, a maintenance window may be defined. The maintenance window can provide an opportunity for system tasks (and/or other tasks, especially those that consume significant database resources)

to execute without significantly impacting the usability of the database. In particular embodiments, a maintenance window may be defined to coincide with a period of relatively low user activity. In some cases, a maintenance window may be implemented in conjunction with a job scheduler and/or a resource manager. Merely by way of example, a resource manager might allocate relatively more system and/or database resources to system tasks during the maintenance window, and/or a job scheduler may schedule system tasks to execute during the maintenance window.

Those skilled in the art will appreciate that various database tasks, which may be necessary and/or helpful to optimize the performance and/or functionality of the database, nonetheless might consume a relatively significant amount of system and/or database resources (including, merely by way of example, system memory, processor cycles, I/O throughput etc.) and therefore might impose a relatively significant impact on any "user tasks" executing in the database when these "system tasks" execute.

As used herein, the term "system task" should be interpreted to mean any task, job, etc. that may be necessary and/or useful for the maintenance, analysis and/or optimization of a database, and/or any task, job, etc. that is scheduled by a database and/or an RDBMS managing a database. Examples of system tasks can include, without limitation, database maintenance operations (e.g., purge operations, table repair operations, etc.), backup and/or replication operations, database analysis operations (e.g., feature utilization analyses, table analyses), indexing operations, and/or the like. The term "user task" can be interpreted to include any task performed or requested by a user (and/or executed on behalf of a user). Merely by way of example, user tasks can include SQL commands, interaction with a database via a mid-tier application, etc. In particular cases, a user may schedule (and/or otherwise define) a particular user task as a system task. In such cases, the user-defined system task may be managed similarly to other system tasks, e.g., as described in more detail below.

2. Exemplary Embodiments

Figure 1A:
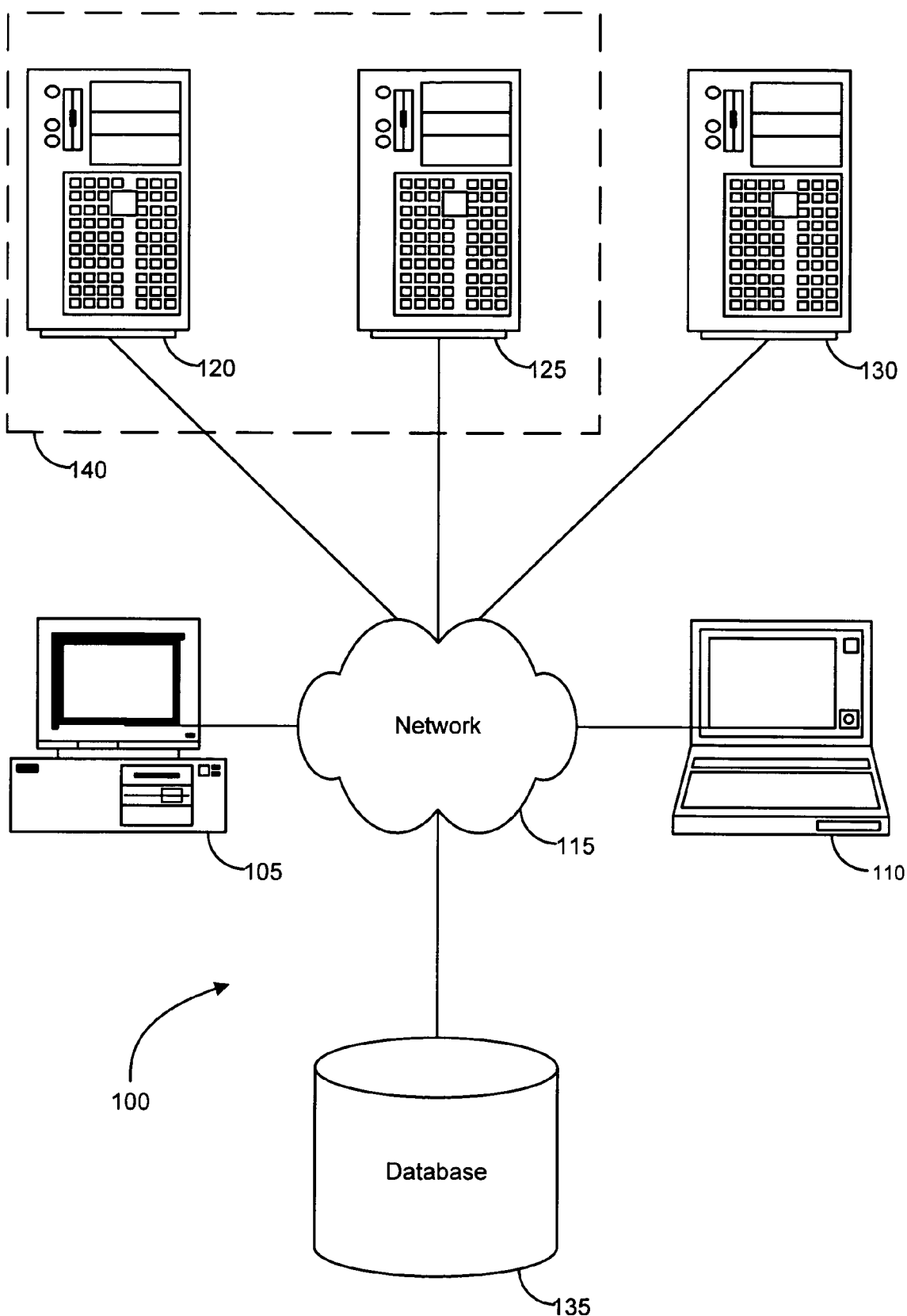
FIG. 1A is an architectural diagram of an exemplary computer network system that can be used to facilitate the automation of database tasks, in accordance with various embodiments of the invention.

Some embodiments of the invention, including without limitation those described generally above, may be performed in a computer system. FIG. 1A illustrates a block diagram of an exemplary system 100 depicting some such embodiments. The system 100 can include one or more user computers 105, 110, which may be used, inter alia, to configure and/or interact with other elements of the system 100, including for example, an RDBMS. The user computers 105, 110 can be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 105, 110 may also have any of a variety of applications, including one or more database client and/or server applications, web browser applications, etc. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA™, IPX™, AppleTalk™, and the like. Merely by way of example, the network 115 may be a local area network ("LAN"), such as an Ethernet network, a Token-Ring™ network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server computers 120, 125, 130. One or more of the servers (e.g., 130) may dedicated to running a mid-tier application, such as a business application, a web server, etc. Such servers may be used to operate databases (and/or RDBMS applications) and/or to allow for the administration of such databases and/or RDBMS systems, including the facilitation of automating certain database tasks. In some cases, the servers 120, 125, 130 may accept input (including without limitation administrator input) from user computers 105, 110. A web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more general purpose computers capable of executing programs or scripts in response to the user computers 105, 110. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The server(s) may also include database servers, including without limitation those commercially available from Oracle™, Microsoft™, Sybase™, IBM™ and the like, which can process requests from database clients running on a user computer 105, 110.

In some embodiments, a mid-tier application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to a mid-tier application and/or a database server. In some cases, an administrator may configure and/or administer (including, for example, the configuration of automated tasks, as described in detail below) a database/RDBMS using a web browser interacting in the above manner with a server. Those skilled in the art will recognize that the functions described with respect to various types of servers may be performed by a single server and/or a plurality of specialized servers, depending on implementation-specific needs and parameters.

In accordance with some embodiments, one or more servers (e.g., 120, 125) may be database servers and/or may be configured to operate in a clustered environment (as indicated by the broken line 140 of FIG. 1). As defined herein, a cluster of computers can include one or more computers that are configured to operate in coordinated fashion, e.g., by providing parallel processing of instructions, responding to job requests cooperatively, maintaining multiple instances of an application and/or a database, and/or the like. In particular embodiments, a cluster may be configured to provide database services, and/or each member ("node") of a cluster may be configured to operate an RDBMS (such as Oracle 10g™), which may be a cluster-aware. Optionally, each server 120, 125 can have a separate partition and/or instance of a database managed by that database management program. The cluster, therefore, can provide database services on a scalable, high-availability basis familiar to those skilled in the art. Each of the servers 120, 125 may also include one or more "clusterware" programs familiar to those skilled in the art. One example of a clusterware program that may be employed in various embodiments is Oracle's Cluster Ready Services™ ("CRS"). In some cases, a particular server may be configured to run both an RDBMS and one or more mid-tier applications.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g™, that is adapted to store, update, and retrieve data in response to SQL-formatted commands.

In particular embodiments, each database server 120, 125 (and/or each cluster node) may include its own database (which is shown on FIG. 1A, for ease of illustration, as a single database 135), which may be stored local to that server, on a network (including a SAN), etc. In some of these embodiments, each server's database may be an instance and/or partition of a common and/or clustered database, an arrangement familiar to those skilled in the art. In other embodiments, each database server 120, 125 may be configured to access a common instance of the database 135.

Figure 1B:
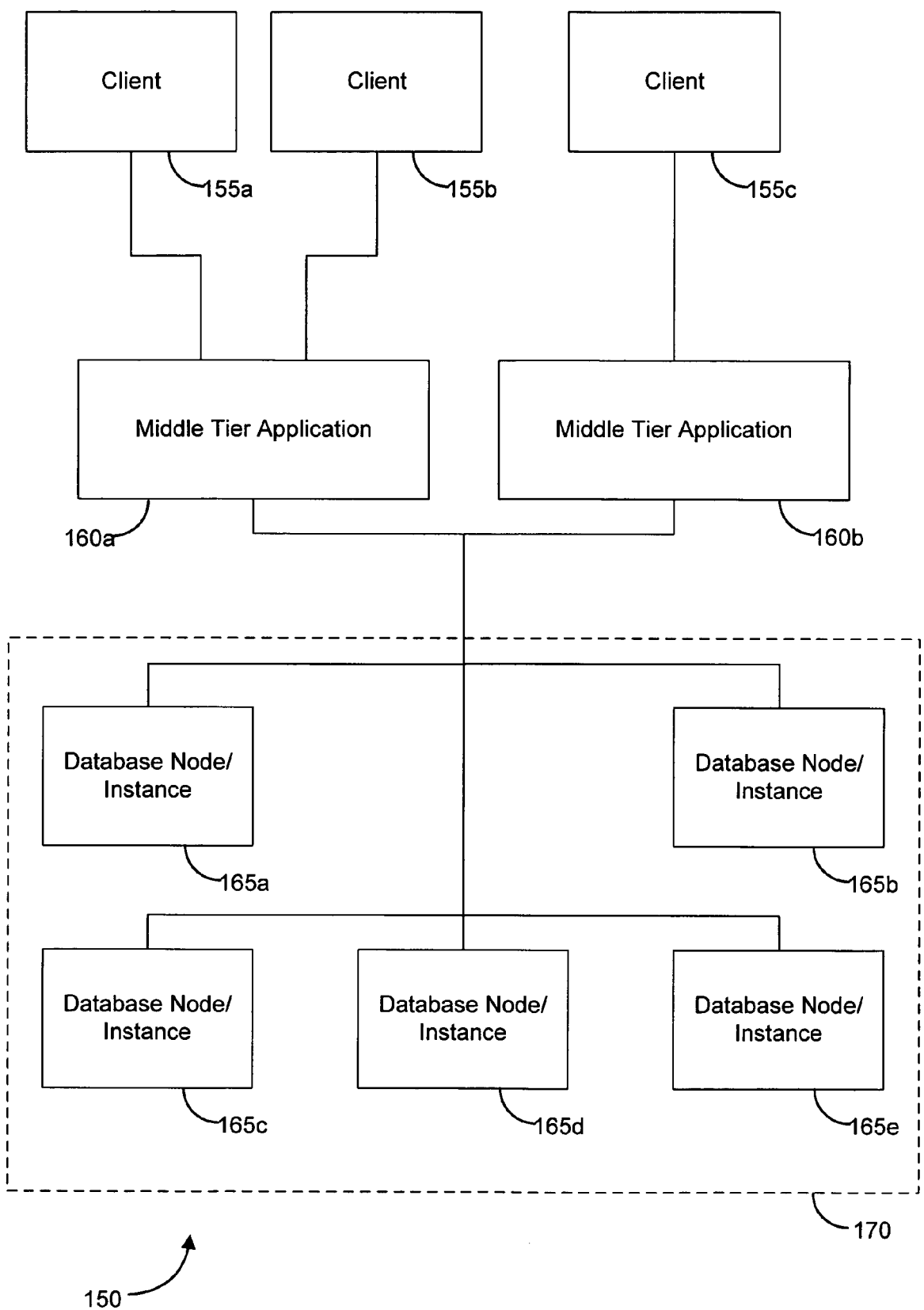
FIG. 1B is a block diagram of a multi-tiered database system that can be used to facilitate the automation of database tasks, in accordance with various embodiments of the invention.

FIG. 1B illustrates a block diagram of a multi-tiered system 150, depicting a relationship between various system components that may be typical of some embodiments. The system 150 may include one or more clients 155 (such as, for example, the clients described above), which may be running on an end user computer. Each of the clients may be in communication with one or more mid-tier applications 160, which, in turn, may be in communication with a database 165 (in some cases, this communication may be mediated by an RDBMS). In various embodiments, as described above, the database 165 may comprise a plurality of instances and/or partitions (e.g., 165*a-e*). In particular embodiments, each of the instances may be part of a cluster arrangement (denoted by the box 170). Thus, the system 150 may include a session and/or connection pooling scheme, whereby a client and/or mid-tier application simply submits a work request to a set of pooled sessions/connections, and the RDBMS allocates the work request based on node/instance availability, load balancing considerations, etc. In some cases, a system task may be automated with respect to a single node/instance of a replicated/clustered database. In other cases, a system task may be automated for an entire cluster/replication set (and/or some discretionary subset thereof).

Figure 1C:
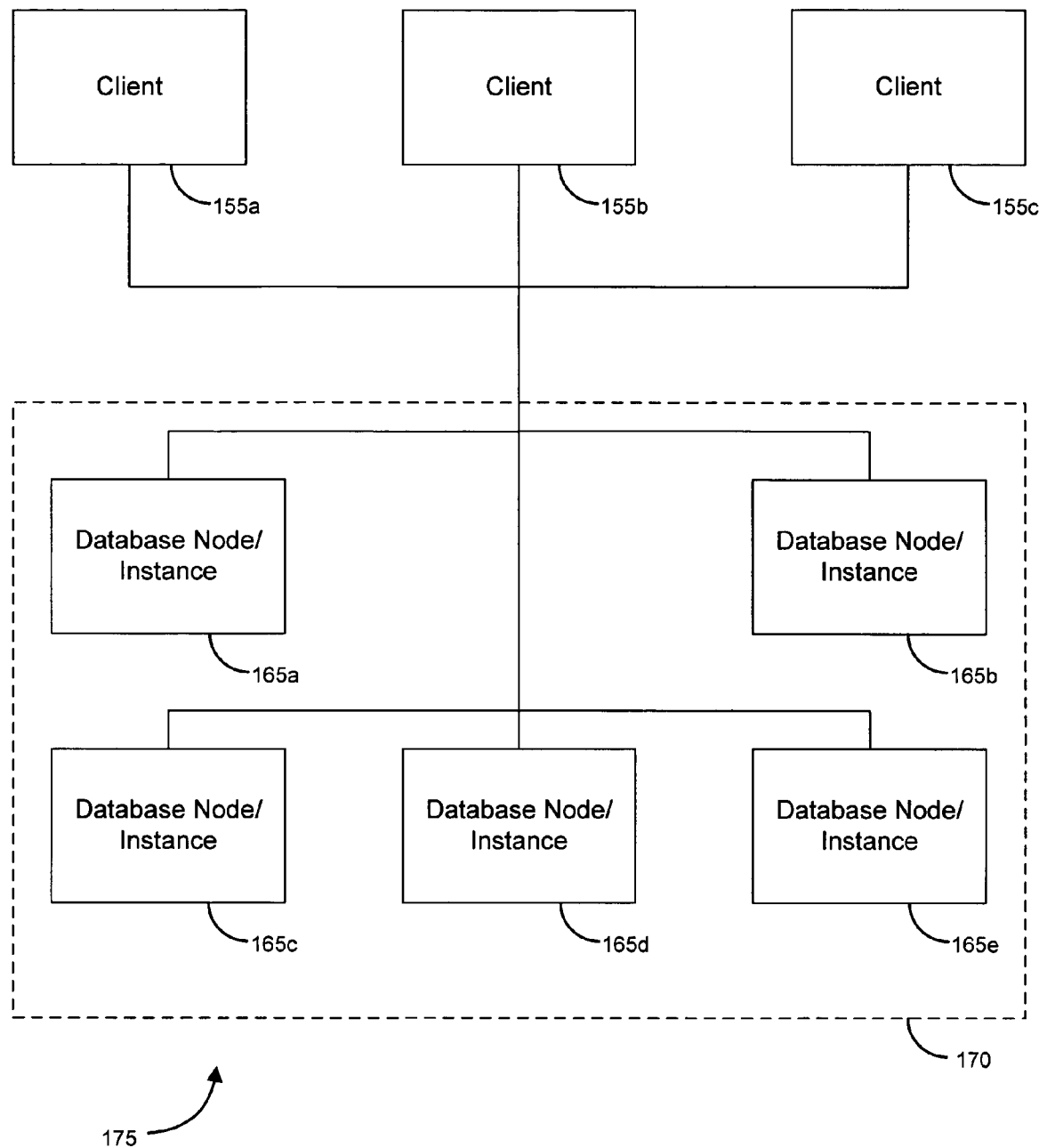
FIG. 1C is a block diagram of an alternative database system that can be used to facilitate the automation of database tasks, in accordance with various embodiments of the invention.

In other embodiments, some examples of which are depicted by the system 175 of FIG. 1C, one or more of the clients 155 may be in direct communication with the database 165 (and/or specific instances and/or partitions thereof). In some such embodiments, there may be no mid-tier application. In other embodiments, there may be a mid-tier application, and/or the system 175 may still be configured to allow a client 155 to access a database (and/or an RDBMS) directly. Some embodiments may operate under a client-server paradigm, well familiar to those skilled in the art.

Figure 2:
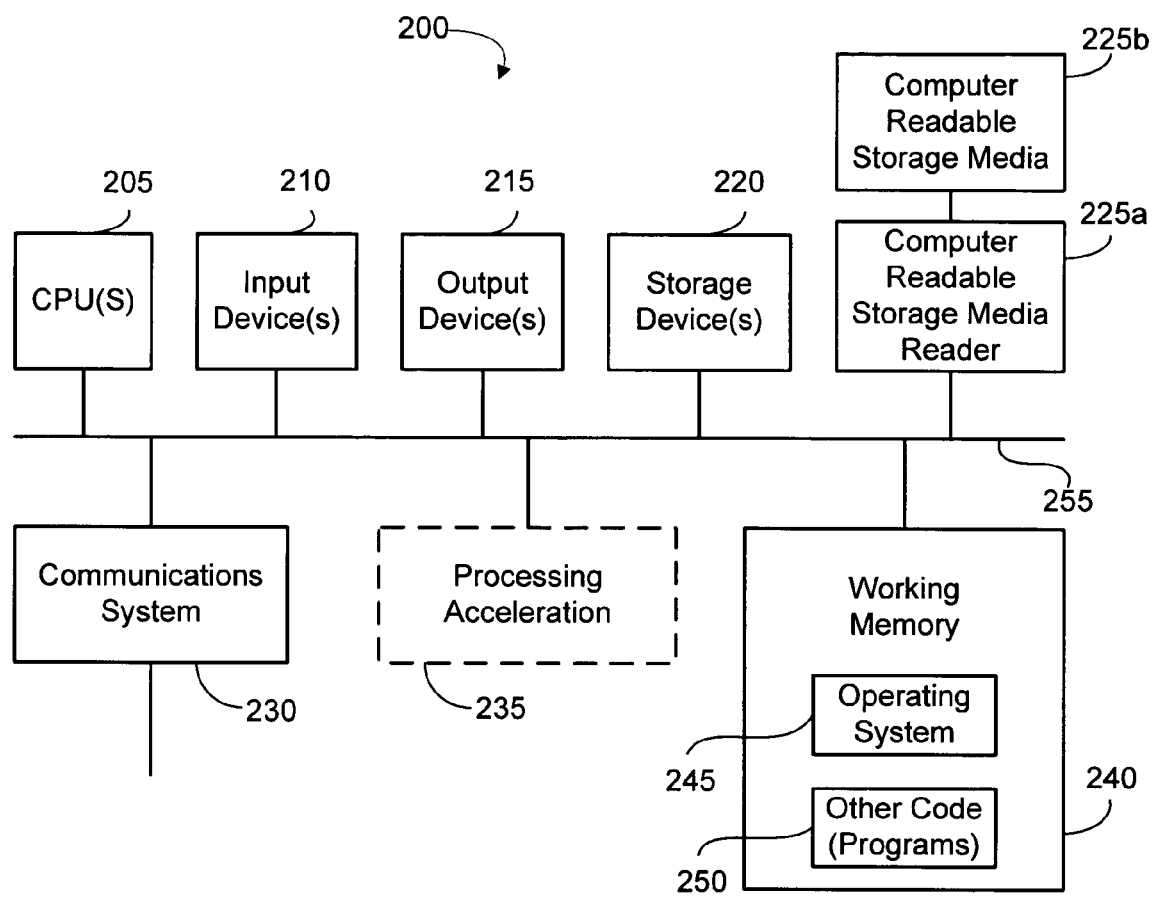
FIG. 2 is a generalized illustration of a computer system that can be used to facilitate the automation of database tasks, in accordance with various embodiments of the invention.

FIG. 2 illustrates one embodiment of a computer system 200, which may be exemplary of any of the computers described above. The computer system 200 is shown comprising hardware elements that may be electrically coupled via a bus 255. The hardware elements may include one or more central processing units (CPUs) 205; one or more input devices 210 (e.g., a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 120 and/or any other computer described above with respect to the system 100.

The computer system 200 may also comprise software elements, shown as being currently located within a working memory 240, including an operating system 245 and/or other code 250, such as an application program (which may be a client application, web browser, mid-tier application, RDBMS, etc.). The application programs may have instructions and/or be designed to implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
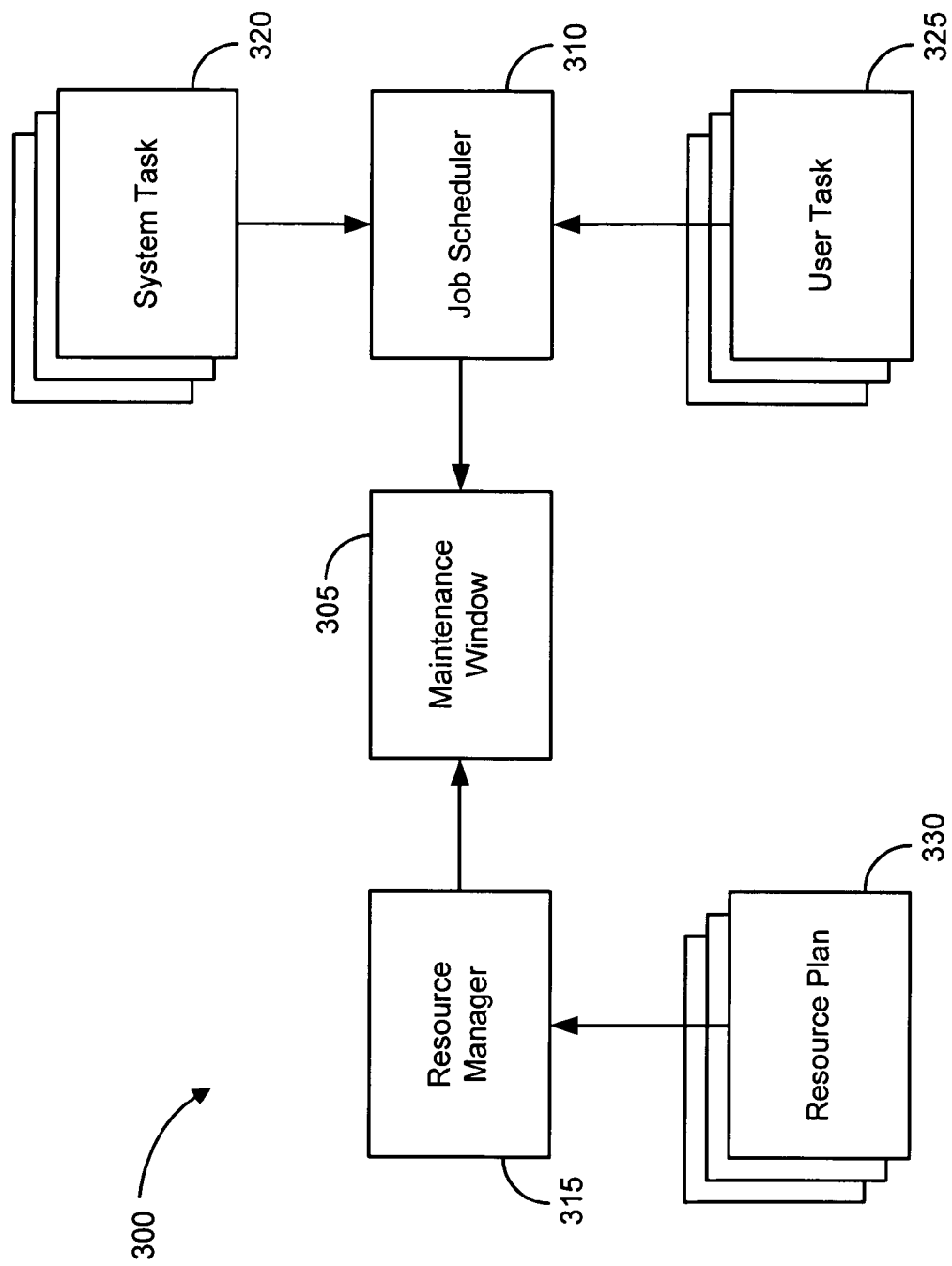
FIG. 3 presents a functional diagram of a system that may be used to facilitate the automation of certain database tasks, in accordance with various embodiments of the invention.

FIG. 3 presents a functional diagram of a system 300 that may be used to facilitate the automation of certain database tasks, in accordance with various embodiments of the invention. The system 300 may comprise a maintenance window. In accordance with some embodiments, a maintenance window may be a construct and/or framework implemented by one or more components of an RDBMS (and/or programs designed to operate in conjunction with the RDBMS. Such components can include, merely by way of example, a job scheduler 310 and/or a resource manager 315. The job scheduler 310 may be a software program and/or module that is designed to manage tasks and/or jobs in a database environment. In some cases, the job scheduler can provide an interface for an administrator to schedule particular tasks (which can be, inter alia, system tasks and/or user tasks) for execution (which may be immediate and/or at some time in the future). In some cases, the job scheduler may allow a recurring task (e.g., a task that is repeated periodically over a specified interval) to be scheduled. In operation, then, the job scheduler 310 has access to a list or library of scheduled jobs, including without limitation a set of system tasks 320 and/or a set of user tasks 325. In some cases, the list/library of scheduled jobs may be stored in one or more tables of a database and/or may be stored separately from the database (by an RDBMS responsible for managing the database, a separate job scheduler program and/or module, etc.). The job scheduler 310 may monitor any scheduled system tasks 320 and/or user tasks 325, and when the scheduled time for a particular task occurs, the job scheduler may execute that task. Optionally, the job scheduler 310 (and/or another program, module and/or component of an RDBMS) may monitor the execution of the scheduled task, perhaps noting any results of the task, whether the task completed, the state of the task when execution halted (perhaps including, in some instances, e.g., if the task was not completed, the progress of the task at the time execution halted), etc.

The resource manager 315 may be a module and/or component of an RDBMS (and/or a separate program, which may be configured to interface with an RDBMS). In some embodiments, the resource manager 315 may be configured to allocate resources among various tasks operating in a database. In particular cases, the resource manager may be configured to impose resource quotas and/or warnings, in order to more robustly control the resources available to and/or used by particular tasks. Resources managed by the resource manager can include any and/or all resources upon which a database typically depends during operation. Merely by way of example, such resources can include, without limitation, available system memory (including, inter alia, stack and/or heap memory), input and/or output resources (collectively referred to as "I/O resources"), parallel execution threads and/or tasks (e.g., for clustered and/or replicated databases), disk space, processor cycles, transactions, execution time, database connections and/or sessions, and/or the like.

In accordance with various embodiments, the resource manager 315 may refer to and/or prepare one or more resource plans 330. A resource plan 330 can be anything that defines how, under particular circumstances, database and/or system resources should be allocated among various tasks (and/or groups of tasks). Merely by way of example, a resource plan might be incorporated in one or more database tables, XML files, etc., which may be managed and/or accessed by a resource manager, RDBMS, etc. In some cases, a resource plan might define (on a proportional and/or absolute basis) how many resources should be allocated to a particular task, application, service, client, end user, etc. In other cases, a resource plan might allocate resources according to categories and/or groups of tasks, applications, services, clients, end users, etc. Merely by way of example, a plurality of tasks may be defined as system tasks, while another plurality of tasks may be defined as user tasks. Similarly, certain end users may be categorized as high-priority users (and may be accorded relatively more resources than other users at certain times). The resource manager may provide a facility for such categorizations/groupings, and/or the resource manager may refer to such categorizations/groupings defined elsewhere (e.g., by a user authentication module of an RDBMS and/or mid-tier application, by a job scheduler, etc.).

In some cases, a database might have a single resource plan, which defines generally how resources should be allocated. In other cases, a database might have a plurality of resource plans, each of which governs resource allocation for a specified period and/or set of circumstances. Merely by way of example, one resource plan might govern resource allocation during business hours, while another resource plan governs resource allocation during non-business hours. As another example, in accordance with certain embodiments, as discussed in more detail below, a database might utilize one or more "maintenance" resource plans during one or more maintenance windows and one or more "operational" resource plans during other periods. (Alternatively and/or in addition, a resource manager might not use a specific maintenance resource plan but instead might be configured to modify and/or vary from an operational resource plan during maintenance windows).

In accordance with various embodiments of the invention, the relationship between a maintenance window 305, a resource manager 315 and/or a job scheduler 310 might take any of a variety of forms. Merely by way of example, a maintenance window 305 might be defined by setting a resource plan (e.g., via the resource manager 315) that gives system tasks relatively more resource priority during a certain period of time, along with, perhaps the scheduling of system tasks (e.g., via the job scheduler 310) only during that period of time. Alternatively (and/or in addition), in certain embodiments, an RDBMS (and/or a program interfacing with an RDBMS) might provided a dedicated facility for defining a maintenance window 305, and/or a resource manager 315 and/or job scheduler 310 might be automatically configured to behave consistently with the maintenance window 205. Merely by way of example, once a maintenance window 305 has been defined, a job scheduler 310 may be (automatically and/or manually) configured to rescheduling system tasks to execute during the defined window, to refuse to allow system tasks to be scheduled except during the defined maintenance window, to refuse to execute system tasks scheduled outside the maintenance window, etc. Similarly, a resource manager 315 may be configured (again, automatically and/or manually) to create a maintenance resource plan to govern resources during the defined maintenance window, to modify an existing resource plan to accommodate the defined window, to ignore an existing resource plan during the defined window, etc.

Other relationships between these entities as well. No matter the relationship between a maintenance window 305, a job scheduler 310 and/or a resource manager 315, however, those skilled in the art will appreciate, based on the disclosure herein that the maintenance window 305 can assist in the automation of certain tasks.

Figure 4:
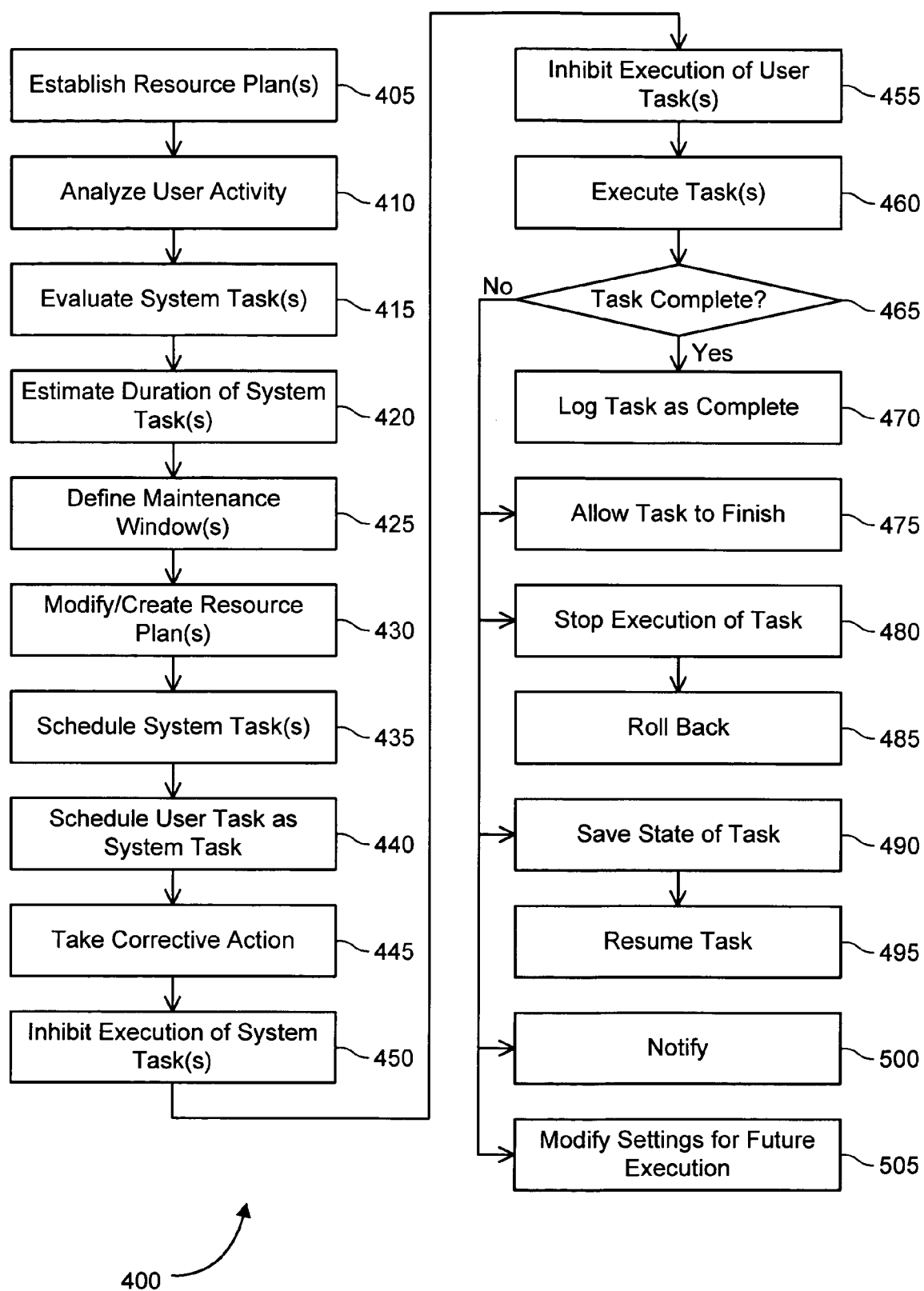
FIG. 4 is a process flow diagram that illustrates an exemplary method of automating certain database tasks, in accordance with various embodiments of the invention.

As noted above, another set of embodiments includes methods for facilitating the automation of tasks. FIG. 4 is a process flow diagram that illustrates several exemplary methods (referred to collectively by the reference numeral 400) for automating certain database tasks, in accordance with various embodiments of the invention. For ease of description one or more of the methods 400 will be described, in some cases, by reference to the components illustrated by FIG. 3. It should be appreciated, however, that various methods of the invention are not limited to any particular functional and/or structural implementation, and therefore, that the descriptions herein should be considered merely illustrative and not limiting.

In accordance with certain embodiments, a method 400 may comprise establishing one or more resource plans (block 405), which are described in detail above. Establishing a resource plan may comprise configuring a resource plan using a resource manager and/or manually editing a resource plan (e.g., with a text editor, etc.). The resource plan may be a file, database table, etc., which might be referenced by a resource manager. In other embodiments, a resource plan may simply be a conceptual framework embodied by rules implemented by, e.g., a resource manager.

At block 410, user activity in a database may be analyzed. Analysis of user activity may comprise gathering and/or evaluating statistics for the database, especially statistics about user activity. (The term "user activity" can also include other database activities that are not directly related to user actions but nonetheless relate to business functions of the database, such as automated monthly reporting tasks, batch processing tasks, etc.) In particular embodiments, statistics about the level of user activity (e.g., number of end user and/or mid-tier application sessions, connections, transactions, number and/or type of SQL statements, etc.) may be gathered and/or evaluated to determine patterns of user activity. Such statistics may show, over the course of a number of days, weeks, months, etc., that user activity falls within certain ranges during certain times of the day and/or certain days of the week and/or month. Using these statistics, it may be possible to determine certain segments of time that during which user activity is relatively low, such that the performance of system tasks would be expected to impose a relatively minor impact on user activities. Merely by way of example, a statistical analysis of user activity might show, on a daily basis, that user activity peaks during the late morning and early afternoon, while user activity is relatively minimal in the early morning hours. Similarly, user activity might be higher on weekends and/or at the beginning and/or end of a month than on mid-month weekends. Based on the disclosure herein, those skilled in the art will appreciate that analysis of user activity can comprise the gathering and/or analysis of any suitable statistics and/or metrics, and that the analysis of user activity likely will lead to different conclusions about the user activity, based on the nature and function of the database at issue. Likewise, those skilled in the art will recognize, again based on the disclosure herein, that a variety of tools (which may be included in an RDBMS and/or supplied by third party vendors) may be used for the analysis of user activity.

At block 415, one or more system tasks (which may or may not have been previously scheduled, e.g., by a job scheduler) may be evaluated. Evaluation of a system task may include determining whether execution of the system task is likely to have a significant impact on user activities (in which case, it may be more appropriate to run that system task during a maintenance window). Evaluation of a system task can also include estimating how frequently a system task should be executed. This estimation may be based on a database vendor's recommendations, the experience of database administrators, etc. The evaluation of a system task may also include estimating a duration of the system task, i.e., how long the system task likely will need to execute completely (block 420). Like the estimate of how frequently a system task should be executed, an estimation of the duration of a system task may consider database vendor estimates, administrator experience, algorithms (perhaps supplied by a vendor or through experience) that consider the size of the database (and/or elements thereof) upon which the system task will operate (and/or upon which the duration of the system task might otherwise depend). Based on the disclosure herein, those skilled in the art will appreciate that a variety of other factors might be included in estimating the frequency and/or duration of any given system task, such as the amount of temporary space available, competition between the task and other tasks for access to a database object, etc.

The method 400 can also comprise defining one or maintenance windows (block 425). As noted above, various embodiments may support different procedures for defining a maintenance window. Merely by way of example, in some embodiments, a maintenance window may be explicitly defined, while in other embodiments, the concept of a maintenance window may be defined implicitly through the use of certain other modules and/or programs, including a job scheduler and/or a resource manager, to name but two examples.

In accordance with some embodiments, one or more maintenance windows may be defined by reference to a result of a user activity analysis and/or an evaluation of system tasks, both of which are discussed above. Merely by way of example, if a user activity analysis indicates that weekday mornings and Sunday afternoons are relatively low periods of user activity, maintenance windows may be defined for these periods (e.g., a maintenance window may be defined to recur daily Monday-Friday from 1:00AM to 4:00AM, and another maintenance window may be defined to recur weekly from 1:00PM-11:00PM on Sunday; alternatively, a series of windows may be defined, each of which recurs weekly during an early morning period of a different weekday). As noted from the above example, a maintenance window may be defined to recur over a specified interval. Alternatively, a maintenance window may be configured as a discrete event and/or to recur on a relatively lengthy interval (e.g., once per year), for instance to accommodate a system task that only needs to be performed once (or relatively infrequently) and/or to accommodate a particularly lengthy system task.

Likewise, a maintenance window may be defined according to the needs of one or more systems tasks that may be executed during the maintenance window. Merely by way of example, if a particular system task is estimated to need at least one hour to complete and should be run weekly, a maintenance window may be defined to recur weekly and/or to be at least one hour in duration. These considerations may be combined with the result of a user activity analysis when determining when and/or how to schedule/configure maintenance windows. In other cases, however, maintenance windows may be defined without regard to any particular system tasks, and/or system tasks may be scheduled (in the manner described below, for example) to coincide with appropriate maintenance windows after the maintenance windows have been defined.

Optionally, as described above, one or more resource plans may be modified—and/or one or more new resource plans may be created—(block 430), e.g., to accommodate the maintenance windows defined at block 425. (Alternatively, in some embodiments–such as, for example, when a maintenance window is defined implicitly—the modification/creation of a resource plan may be part of the procedure for defining a maintenance window). In some cases, the procedure for modification/creation of a resource plan may be similar to that described above with respect to block 405. In particular embodiments, no resource plans may need to be modified/created; as noted above, for example, a resource manager may simply ignore existing resource plans during a maintenance window.

At block 435, one or more system tasks may be scheduled (and/or rescheduled). In accordance with some embodiments, scheduling a system task may comprise comparing an evaluation of a system task with one or more defined maintenance windows, such that the system task may be scheduled during a maintenance window that provides a sufficient duration for the system task to execute and/or recurs frequently enough to allow the system task to execute according to the evaluation of how frequently the system task should be run. It should be noted, however, that a maintenance window need not (and often will not) be coextensive with the execution of a particular task, however. Merely by way of example, if a task is estimated to take one hour to execute and needs to be run on a weekly basis, it could be scheduled to run every Wednesday at 1:00AM, which might be fall into a maintenance window defined to recur every weeknight from 12:00AM to 3:00AM. Likewise, several tasks may be scheduled to run in any given maintenance window. Such tasks might be offset from one another (e.g., scheduling a first task on one night and scheduling a second task on a different night, with task running during the same recurring maintenance window, and/or scheduling a one task for 1:00AM and another for 2:00AM, during a maintenance window that runs from 12:00AM to 3:00AM). In other embodiments, a maintenance window may be dedicated to a particular task, either explicitly or implicitly (e.g., by not scheduling any other tasks during that window).

In yet further embodiments, a plurality of tasks may be scheduled at the same time (in which case, they may run concurrently and/or one of the tasks may be delayed until the other task finished). In some such embodiments, the execution of the two tasks may be managed by a resource manager (e.g., by allocating relatively more—or all—system resources to a particular task) and/or by a job scheduler (e.g., by delaying a scheduled task until the completion of a higher-priority scheduled task). Based on the disclosure herein, one skilled in the art will appreciate that there are a variety of schemes in which one or more tasks may be scheduled and/or executed, perhaps relative to each other and/or to one or maintenance windows, in accordance with various embodiments of the invention.

In accordance with some embodiments, it may be desirable to schedule one or more user tasks as system tasks (block 440), e.g., so that the user task may be scheduled and/or executed, perhaps during a maintenance window. This procedure may be useful, inter alia, in cases in which a user task is likely to consume significant resources and/or can be performed on a delayed basis. In some cases, this procedure may be performed manually by a user and/or an administrator (e.g., by configuring the user task(s) with a job scheduler, adding the user tasks to a system task group, etc.). In other cases, the procedure may be performed automatically and/or semi-automatically, perhaps in the same way. Merely by way of example, if it is known that a particular user task often consumes significant resources (perhaps via an analysis of user activity, as discussed above), an RDBMS (and/or related program) may automatically convert that user task to a system task, optionally with a notification (e.g., by message box, email, etc.) to an administrator and/or a user/group/application responsible for the user task. Alternatively and/or in addition, a program may simply suggest to an administrator and/or a user (based on similar considerations) that a particular user task might be suitable to be executed as system task, and/or with confirmation from the user and/or administrator, might automatically take any necessary steps to convert the user task to a system task.

In some cases, the system may detect a problem with the scheduling of certain tasks. Merely by way of example, a task may be scheduled within a maintenance window with a duration shorter than the estimated execution time for the scheduled task. Other examples include the scheduling of a plurality of tasks within the same window, such that it is likely that one or more of the tasks will be unable to execute completely within the maintenance window, and/or the scheduling of a task outside of a maintenance window (e.g., scheduling a task during a time not covered by a maintenance window, scheduling a daily task to coincide with a window that recurs weekly, etc.). In such cases, one or more corrective actions may be taken (block 445). Corrective actions can include redefining a maintenance window to accommodate a task, rescheduling one or more tasks for another, more appropriate time, allocating relatively more resources to a task (e.g., by modifying a resource plan) and/or notifying an administrator of the problem, allowing the administrator to correct the problem manually, etc.

For some system tasks, it may be appropriate to allow those tasks to run at any time, regardless of whether a maintenance window is in effect. In other cases (e.g., where an evaluation of a system task indicates that the execution of the task is likely to significantly impact user activities), it may be appropriate to inhibit execution of the system task except during maintenance windows (block 450). This inhibition may be performed in a variety of ways. Merely by way of example, a resource manager may be configured (e.g., with a resource plan) not to allocate to a certain task (and/or group/class of tasks) any resources, except during a maintenance window. As another example, a job scheduler may be configured not to schedule a given task (and/or group/class of tasks) except during defined maintenance windows, to reschedule such tasks to execute during defined maintenance windows, and/or not to allow execution of such tasks already scheduled outside of a defined maintenance window. Other ways of inhibiting the execution of system tasks are possible as well.

Similarly, it may be desirable to inhibit the execution of user tasks during defined maintenance windows (block 455), in order, for instance, to ensure that scheduled system tasks have sufficient resources to execute completely during the maintenance window. Inhibiting user tasks may be accomplished in a variety of ways. Merely by ways of example, the system may be configured to deny access to users during maintenance windows (e.g., using access control lists, by refusing all database connections, by disconnecting from a network, etc.). Alternatively, the system may be configured to accept and/or queue user tasks. In other embodiments, a resource manager (perhaps via a resource plan) may be configured to allocate relatively few (or no) resources to user tasks during maintenance windows. It should be appreciated that some user tasks may be inhibited, while others (such as, for example, tasks from high-priority users, applications and/or groups thereof, and/or tasks requiring relatively few resources), may be allowed.

At block 460, one or more tasks may be executed. In accordance with particular embodiments, a task may be a scheduled task, and/or the task may be initiated by a job schedule and/or other component of (or program associated with) an RDBMS. In other embodiments, a task may be initiated manually by an administrator, an end user and/or a mid-tier application (and/or a component thereof). In particular embodiments, the task may be a system task and/or may be executed within a defined maintenance window, as described elsewhere herein.

In particular embodiments, tasks may be monitored, e.g., to ensure that they execute completely during a maintenance window (block 465). If a given task does complete its execution, some implementations of the invention will require no action. Optionally, the execution of the task (including, perhaps a record of any results of the task) may be logged, output to a console, reported, etc. (block 470), using any of several procedures familiar to those skilled in the art.

If a task is unable to execute completely, however, one (or more) of several actions may be taken. Merely by way of example, in some embodiments, the task may be allowed to finish executing outside the maintenance window (block 475). If appropriate, a resource manager may allocate sufficient resources to the task (e.g., by temporarily modifying a resource plan and/or temporarily varying a resource plan) to allow the task to finish expeditiously. Alternatively and/or in addition, a resource manager may allocate relatively fewer resources to the task than might have been allocated during the maintenance window (for example, using similar procedures), in order to allow the task to finish execution but mitigate impact on user tasks and/or other system tasks.

Alternatively, the execution of the task may be stopped (block 480). In some cases, stopping the execution of a task may comprise allocating no resources to the task. In other cases, a program and/or module (perhaps a job scheduler, job manager, and/or a component of the RDBMS) may issue a command to halt the task. Those skilled in the art are familiar with a variety of ways to halt an executing task in a database. Optionally, any changes to the database (and/or any elements thereof) may be rolled back (block 485), e.g., to a state that existed prior to beginning execution of the task, so as to protect the database and/or its elements from inconsistencies introduced by the partial execution of the task. Procedures for tracking changes to a database introduced by the execution of a database task and/or job are well-known in the art and need not be discussed in detail here.

In particular cases, the state of a task at the time the task stopped executing may be saved (block 490), and/or the task may be resumed at a later time (block 495). Merely by way of example, if a task is configured to operate on a certain table of a database, information about the progress of that operation may be saved (e.g., in a log file, in a database, perhaps the database on which the task operated, etc.). Using that information, the task may be resumed at a later time (perhaps during a subsequent maintenance window, etc.). In some instances, a job scheduler automatically may reschedule the task for resumption at an appropriate time.

In other cases, an administrator, end-user, mid-tier application, etc may be notified of incomplete status of the task's execution (block 500). The notified entity may then determine the appropriate action to take (e.g., resuming the task manually, rescheduling the task for later execution, etc.). Notification can take any appropriate form, including, inter alia, notification by email, by status message (e.g., at a client application and/or web browser), by inter-application message (e.g., to a mid-tier application), etc. In some cases, an alert may be sent to a database management tool, which may be configured to perform monitor the status of the database and/or provide notifications (perhaps in the manner described above).

Optionally, system settings may be modified to increase the chance that the task will be able to execute completely in future iterations (block 505). This procedure may be performed automatically and/or through administrator interaction. Merely by way of example, a job scheduler may reschedule the task to execute earlier in a maintenance window (e.g., if the maintenance window runs from 12:00AM to 3:00AM, and the task was originally scheduled for execution at 2:00AM, the task might be rescheduled for 1:00AM in future iterations). Alternatively and/or in addition, the task may be rescheduled to coincide with a larger maintenance window, and/or the maintenance window may be expanded (either temporarily or permanently) to accommodate the task's complete execution.

In the foregoing description, for the purposes of illustration, various methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable mediums suitable for storing electronic instructions.

For instance, some embodiments of the invention provide software programs, which may be executed on one or more computers, for performing the methods described above. Alternatively, the methods may be performed by a combination of hardware and software. Merely by way of example, by reference to the exemplary methods 400 illustrated by FIG. 4, a software program might be configured to perform an analysis of user activity and, based on that analysis, define one or more maintenance windows. The software program might also analyze all currently-scheduled system tasks and, based on that evaluation, schedule (and/or reschedule) those system tasks during appropriate maintenance windows. The software program might further inhibit the execution of some (or all) of these system tasks except during the maintenance windows for which they are scheduled. Based on the disclosure herein, one skilled in the art will appreciate that such a program may also be configured to perform other procedures described herein, but the above example will suffice for purposes of illustration.

It should be noted as well that such software programs may be executed with any desired level of automation (or conversely, administrator interaction). Merely by way of example, the process of defining a maintenance window may be performed in an entirely automated fashion, perhaps based on an activity analysis (which may also be automated) and/or an evaluation of the system tasks to be executed. In other embodiments, however, the software program might suggest maintenance windows (based, perhaps, on the same factors) but allow an administrator to customize the maintenance windows and/or the system tasks scheduled to execute during those windows. In still other embodiments, an administrator may perform many of these tasks manually (e.g., analyzing user activity, defining a maintenance window, scheduling system tasks, etc.), perhaps using configuration tools and/or by editing configuration files manually.

Further, in certain embodiments, the software program may perform these actions through interfaces (e.g., APIs) with other programs and/or components of an RDBMS. Merely by way of example, the program responsible for defining a maintenance window may not actually schedule tasks or modify resource plans but may instead interface with a job scheduler and/or a resource manager, respectively, to effect these actions. In particular embodiments, however, these components may be integrated into a single program, such as an RDBMS. Those skilled in the art will appreciate, based on the disclosure herein, that the organization of software programs and/or modules is discretionary.

Hence, various embodiments of the invention provide inventive methods, systems and software products for managing and/or automating database tasks. The description above identifies certain exemplary embodiments for implementing the invention, but those skilled in the art will recognize that many modifications and variations are possible within the scope of the invention. The invention, therefore, is defined only by the claims set forth below.

What is claimed is:

1. In a database environment, a computer-implemented method for managing system resources of a computer system, the method comprising:
  defining a plurality of maintenance windows during which system tasks may be executed by the computer system without significantly impacting user tasks, the plurality of maintenance windows comprising a first maintenance window and a second maintenance window;
  scheduling a first system task to execute during the first maintenance window;
  scheduling a second system task to execute during the second maintenance window;
  allocating system resources for the first system task during the first maintenance window; and
  inhibiting the at least one system task from executing on the computer system, except during the first maintenance window;
  wherein:
    the first maintenance window is defined to recur periodically over a first interval, such that the first system task executes periodically over the first interval; and
    the second maintenance window is defined to recur periodically over a second interval, such that the second system task executes periodically over the second interval.

2. A method for managing system resources as recited in claim 1, the method further comprising:
  estimating whether a duration of the first maintenance window will be sufficient to allow complete execution of the first system task.

3. A method for managing system resources as recited in claim 2, the method farther comprising:
  issuing a warning if it is estimated that the duration of the first maintenance window will not be sufficient to allow complete execution of the first task.

4. A method for managing system resources as recited in claim 2, the method further comprising:
  disabling the first system task if it is estimated that the duration of the first maintenance window will not be sufficient to allow complete execution of the first system task.

5. A method for managing system resources as recited in claim 2, the method further comprising:
  extending the first maintenance window if it is estimated that the duration of the first maintenance window will not be sufficient to allow complete execution of the at least one system task.

6. A method for managing system resources as recited in claim 1, the method further comprising:
  evaluating the first system task to determine whether the first system task likely will consume sufficient resources to impact user tasks.

7. A method for managing system resources as recited in claim 6, the method further comprising:
  determining, based on an evaluation of the first system task, that the first system task should be inhibited from executing except during the first maintenance window.

8. A method for managing system resources as recited in claim 1, the method further comprising:
  establishing a resource plan that defines how system resources should be allocated among a plurality of competing tasks, the plurality of competing tasks comprising the at least one user task and the first system task.

9. A method for managing system resources as recited in claim 8, the method further comprising:
  modifying the resource plan to allocate relatively more system resources to the first system task during the first maintenance window.

10. A method for managing system resources as recited in claim 8, wherein the resource plan is a first resource plan, and wherein the first resource plan defines how system resources should be allocated outside the first maintenance window, the method further comprising:
  establishing a second resource plan that defines how system resources should be allocated among the plurality of competing tasks during the first maintenance window, wherein the second resource plan allocates relatively more system resources to the first system task during the first maintenance window than does the first resource plan.

11. A method for managing system resources as recited in claim 1, the method further comprising:
  inhibiting the execution of the at least one user task during the first maintenance window.

12. A method for managing system resources as recited in claim 1, the method further comprising:
  allowing a user to schedule a user task to run as a system task during the first maintenance window.

13. A method for managing system resources as recited in claim 1, wherein defining a plurality of maintenance windows comprises automatically defining at least one maintenance window.

14. A method for managing system resources as recited in claim 1, wherein defining a plurality of maintenance windows comprises:
  analyzing a historical pattern of user activity for the database, wherein the historical pattern of user activity comprises at least one periodic segment of relatively high user activity and at least one periodic segment of relatively low user activity; and
  defining at least one maintenance window that coincides with the at least one periodic segment of relatively low user activity.

15. A method for managing system resources as recited in claim 1, wherein defining a plurality of maintenance windows comprises allowing a user to define at least one maintenance window.

16. A method for managing system resources as recited in claim 1, wherein the plurality of maintenance windows comprises a first maintenance window and a second maintenance window, the method further comprising:
  defining a maintenance window group, the maintenance window group comprising the first maintenance window and the second maintenance window.

17. A method for managing system resources as recited in claim 1, wherein the first interval is not the same as the second interval.

18. A method for managing system resources as recited in claim 1, wherein the first interval is offset from the second interval, such that the first maintenance window and the second maintenance window do not occur at the same time.

19. A method for managing system resources as recited in claim 1, the method further comprising:
  if the first system task has not finished executing before the first maintenance window has expired, allowing the first system task to finish executing outside the first maintenance window.

20. A method for managing system resources as recited in claim 1, wherein allocating resources for the first system task comprises allocating fewer system resources for the at least one user task during the first maintenance window than at other times, and allocating more system resources for the first system task during the first maintenance window than at other times.

21. In a database environment, a computer-implemented method for managing system resources of a computer system, the method comprising:
 defining a maintenance window during which system tasks may be executed by the computer system without significantly impacting user tasks;
 scheduling at least one system task to execute during the maintenance window;
 allocating system resources for the at least one system task during the maintenance window; and
 inhibiting the at least one system task from executing on the computer system, except during the defined maintenance window; and
 if the at least one system task has not finished executing before the maintenance window has expired, stopping the execution of the at least one system task at the expiration of the maintenance window;
 wherein the at least one system task comprises an operation selected from the group consisting of a purge operation, a statistic gathering operation, a database analysis operation, a feature usage analysis operation, a backup operation and a database replication operation.

22. A method for managing system resources as recited in claim 21, the method further comprising:
 rolling back a result of the at least one system task to a state that existed before the execution of the at least one system task.

23. A method for managing system resources as recited in claim 21, the method further comprising:
 if the execution of the at least one system task is stopped before the at least one system task has fully executed, saving a state of the at least one system task.

24. A method for managing system resources as recited in claim 23, the method further comprising:
 resuming during a subsequent maintenance window the at least one system task, based on the saved state of the at least one system task.

25. A method for managing system resources as recited in claim 21, the method further comprising:
 if the execution of the at least one system task is stopped before the at least one system task has fully executed, notifying an administrator that the at least one system task failed to fully execute.

26. A method for managing system resources as recited in claim 21, the method further comprising:
 if the execution of the at least one system task is stopped before the at least one system task has fully executed, allowing an administrator to increase the duration of a subsequent maintenance window to allow the at least one system task to fully execute during the subsequent maintenance window.

27. A method for managing system resources as recited in claim 21, the method further comprising:
 if the execution of the at least one system task is stopped before the at least one system task has fully executed, automatically increasing the duration of a subsequent maintenance window to allow the at least one system task to fully execute during the subsequent maintenance window.

28. A computer system comprising:
 a database;
 a processor in communication with the database; and
 a computer readable medium in communication with the processor, the computer readable medium comprising instructions executable by the processor to:
  define a plurality of maintenance windows for the database during which system tasks may be executed by the computer system without significantly impacting user tasks, the plurality of maintenance windows comprising a first maintenance window and a second maintenance window; schedule a first system task to execute during the maintenance window;
  schedule a second system task to execute during the second maintenance window;
  allocate system resources to the first system task during the first maintenance window; and
 inhibit the first system task from executing except during the first maintenance window;
 wherein:
  the first maintenance window is defined to recur periodically over a first interval, such that the first system task executes periodically over the first interval; and
  the second maintenance window is defined to recur periodically over a second interval, such that the second system task executes periodically over the second interval.

29. A computer-readable storage medium having stored thereon a computer program for managing system resources for a database, the computer program comprising instructions executable by a computer system to:
 define a plurality of maintenance windows for the database during which system tasks may be executed by the computer system without significantly impacting user tasks, the plurality of maintenance windows comprising a first maintenance window and a second maintenance window;
 schedule a first system task to execute during the maintenance window, to mitigate an impact imposed on a least one user task by the execution of the first system task by the computer system;
 schedule a second system task to execute during the second maintenance window;
 allocate system resources to the first system task during the first maintenance window; and
 inhibit the first system task from executing except during the first maintenance window;
 wherein:
  the first maintenance window is defined to recur periodically over a first interval, such that the first system task executes periodically over the first interval; and
  the second maintenance window is defined to recur periodically over a second interval, such that the second system task executes periodically over the second interval.

30. A computer program as recited in claim 29, wherein the computer program is incorporated in a relational database management system.

31. A computer program as recited in claim 29, wherein the computer program is configured to interoperate with a relational database management system.

32. A computer system comprising:
 a database;
 a processor in communication with the database; and
 a computer readable medium in communication with the processor, the computer readable medium comprising instructions executable by the processor to:
  define a maintenance window during which system tasks may be executed by the computer system without significantly impacting user tasks;

schedule at least one system task to execute during the maintenance window;

allocate system resources for the at least one system task during the maintenance window; and inhibit the at least one system task from executing on the computer system, except during the defined maintenance window; and if the at least one system task has not finished executing before the maintenance window has expired, stop the execution of the at least one system task at the expiration of the maintenance window;

wherein the at least one system task comprises an operation selected from the group consisting of a purge operation, a statistic gathering operation, a database analysis operation, a feature usage analysis operation, a backup operation and a database replication operation.

33. A computer-readable storage medium having stored thereon a computer program for managing system resources for a database, the computer program comprising instructions executable by a computer system to:

define a maintenance window during which system tasks may be executed by the computer system without significantly impacting user tasks;

schedule at least one system task to execute during the maintenance window;

allocate system resources for the at least one system task during the maintenance window; and inhibit the at least one system task from executing on the computer system, except during the defined maintenance window; and if the at least one system task has not finished executing before the maintenance window has expired, stop the execution of the at least one system task at the expiration of the maintenance window;

wherein the at least one system task comprises an operation selected from the group consisting of a purge operation, a statistic gathering operation, a database analysis operation, a feature usage analysis operation, a backup operation and a database replication operation.

* * * * *

UNITED STATES PATENT AND TRADEMARK OFFICE
CERTIFICATE OF CORRECTION

PATENT NO. : 7,440,973 B2 Page 1 of 1
APPLICATION NO. : 10/903594
DATED : October 21, 2008
INVENTOR(S) : Tsukerman et al.

It is certified that error appears in the above-identified patent and that said Letters Patent is hereby corrected as shown below:

On title page, item (75), in column 1, under "Inventors", line 3, delete "Draaller," and insert -- Draaijer, --, therefor.

In column 5, line 65, delete "may can be" and insert -- may be --, therefor.

In column 6, line 2, delete "IPX™,AppleTalk™," and insert -- IPX™, AppleTalk™, --, therefor.

In column 8, line 28, delete "like" and insert -- like. --, therefor.

In column 8, line 61, delete "(and/or" and insert -- and/or --, therefor.

In column 16, line 46, delete "etc.)," and insert -- etc.) --, therefor.

In column 17, line 33, in claim 3, delete "farther" and insert -- further --, therefor.

In column 20, line 36, in claim 29, delete "a" and insert -- at --, therefor.

Signed and Sealed this

Twentieth Day of April, 2010

David J. Kappos
*Director of the United States Patent and Trademark Office*